(12) United States Patent
Dean et al.

(10) Patent No.: US 10,416,677 B2
(45) Date of Patent: Sep. 17, 2019

(54) AUTONOMOUS VEHICLE ROUTING USING ANNOTATED MAPS

(71) Applicant: Uber Technologies, Inc., San Francisco, CA (US)

(72) Inventors: Robert Dean, Pittsburgh, PA (US);
Bryan Nagy, Pittsburgh, PA (US);
Anthony Stentz, Pittsburgh, PA (US);
Brett Bavar, Pittsburgh, PA (US);
Xiaodong Zhang, Pittsburgh, PA (US);
Adam Panzica, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 7 days.

(21) Appl. No.: 15/812,606

(22) Filed: Nov. 14, 2017

(65) Prior Publication Data
US 2019/0146509 A1    May 16, 2019

(51) Int. Cl.
*G06Q 40/08* (2012.01)
*G05D 1/02* (2006.01)
*G01C 21/34* (2006.01)
*G05D 1/00* (2006.01)
*G06N 7/00* (2006.01)
*G06N 20/00* (2019.01)

(52) U.S. Cl.
CPC ....... *G05D 1/0214* (2013.01); *G01C 21/3492* (2013.01); *G05D 1/0088* (2013.01); *G06N 7/005* (2013.01); *G06N 20/00* (2019.01)

(58) Field of Classification Search
CPC ........ G05D 1/0214; G05D 1/02; G06Q 40/08; G01C 22/00; G01C 21/00; G01C 21/34; G08G 1/16; G06F 17/10
See application file for complete search history.

(56) References Cited

U.S. PATENT DOCUMENTS

| | | | | |
|---|---|---|---|---|
| 10,042,359 B1* | 8/2018 | Konrardy | ............. | G05D 1/0088 |
| 10,145,699 B2* | 12/2018 | Spinelli | ................. | G01C 21/20 |
| 2008/0097699 A1* | 4/2008 | Ono | .................... | B60R 21/0134 |
| | | | | 701/300 |
| 2010/0036599 A1* | 2/2010 | Froeberg | ............ | G01C 21/3461 |
| | | | | 701/532 |
| 2014/0074402 A1* | 3/2014 | Hassib | ............... | G01C 21/3461 |
| | | | | 701/533 |

(Continued)

FOREIGN PATENT DOCUMENTS

| CN | 104567898 | 4/2015 |
|---|---|---|
| WO | WO 2016/135561 | 9/2016 |

OTHER PUBLICATIONS

ISR and Written Opinion in PCT/US2018/061024 dated Jan. 23, 2019.

*Primary Examiner* — Yuri Kan
(74) *Attorney, Agent, or Firm* — Mahamedi IP Law LLP

(57) ABSTRACT

A system and method for autonomous vehicle routing using annotated maps. For at least some path segments within a geographic region in which the vehicle is operating, values are determined for the path segments based at least on risk factors associated with autonomous operation of the vehicle along each path segment. Path segments are combined to generate a travel route, from a first location to a second location, based on the determined values, and the vehicle is controlled to navigate along the travel route.

19 Claims, 7 Drawing Sheets

(56) References Cited

U.S. PATENT DOCUMENTS

| | | | |
|---|---|---|---|
| 2014/0350970 A1* | 11/2014 | Schumann, Jr. | G06Q 40/08 705/4 |
| 2015/0015712 A1* | 1/2015 | Sempuku | G08G 1/165 348/148 |
| 2016/0299509 A1* | 10/2016 | Ueda | G05D 1/024 |
| 2017/0241791 A1* | 8/2017 | Madigan | G06Q 40/08 |

\* cited by examiner

AUTONOMOUS VEHICLE ROUTING USING ANNOTATED MAPS

BACKGROUND

Precise, detailed road maps offer many advantages in autonomous vehicle (AV) operations. Creating these maps can involve recording, processing, and labeling ground truth data (e.g., image and/or LIDAR data), and the resulting maps can be provided for on-board storage and used to perform vehicle routing and dynamic comparisons by the AV's processing systems with a live sensor view of the AV's surroundings.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
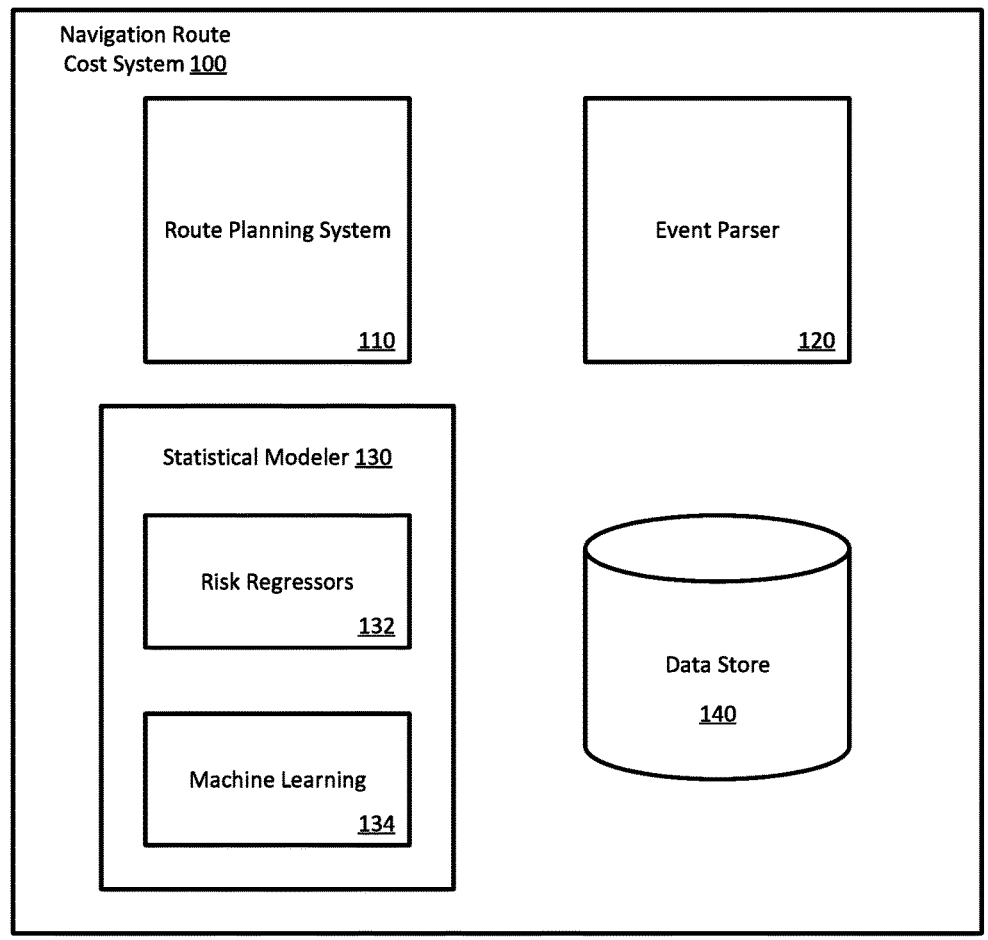
FIG. 1 illustrates an example system for controlling navigation of a vehicle, in accordance with some aspects.

A travel-path network for a geographic region (e.g., a road network for a metropolitan area) can be analyzed on a high-level and mapped using ground truth data from recording vehicles having sensor systems (e.g., LIDAR and stereoscopic cameras). The travel-path network can then be parsed into path segments across the region for potential autonomous vehicle (AV) operation. These path segments can be determined on a high level based on lane geometry, intersection complexity, traffic law complexity, traffic flow, pedestrian density, and the like. Furthermore, the path segments can be temporally sensitive and conditionally sensitive. For example, certain path segments can be safe for AV operation only during certain times of day or night, when traffic conditions permit, or when weather conditions permit. As described herein, travel times and risk factors associated with operating an AV along a given path segment can be determined and refined computationally through risk regression and machine learning techniques.

Additionally or alternatively, the path segments can be determined through ground truth mapping and labelling or heuristically through computational analysis of AV driving log data from AVs traveling throughout the region. The driving log data from AVs can be parsed and processed by trained risk regressors to determine a fractional risk quantity for an AV operating on any given path segment for a variety of different cost layers. In some examples, these cost layers include travel time and risk factors such as an intervention risk factor (i.e., a risk that a safety driver for the AV has to take control), including events that indicate the vehicle is incapable of autonomous operation along a given path segment; a bad experience risk factor, including events that indicate hard stops, jerking motions, and other events that impact a passenger experience; and a harmful event risk factor, including collisions involving the vehicle. Accordingly, a navigation cost route system can annotate localization maps used for AV navigation with the computed cost layers so that AVs in the geographic region can navigate more efficiently.

As provided herein, a "path segment" can comprise a paved road segment, unpaved road segment, or off-road segment utilizable by vehicles, and can include predetermined paths over land, water, underwater, and through the air (e.g., for aerial drones used for autonomous package or human transport). Thus, a "path" can comprise any sequence of connected path segments traversable by a vehicle, and can further comprise any combination of land, aerial, and aquatic path segments. Along these lines, a "driver" may be any operator of a vehicle, such as an aerial vehicle, a typical road-based or off-road vehicle, a marine vehicle, or a hybrid aerial, land, and/or marine-based vehicle. Furthermore, a "lane segment" included on a typical paved road in a road network can have a predetermined length (e.g., two-hundred meters) and/or can be parsed from a road segment between intersections. A "road segment" can be comprised of multiple individual lane segments (e.g., a left lane segment and a right lane segment), either having a common directional aspect or bidirectional. For example, on a four lane highway in a north/south alignment, the northern lanes may have a left and right lane segment and the southern lanes may as well. Accordingly, a total path for an AV from a starting point to a destination can be comprised of a sequential set of capability-in-scope lane segments from the starting point to the destination, each having an attributed fractional risk quantity calculated by a risk regressor based on static and dynamic conditions, as described herein.

Described throughout the present disclosure are risk regression and trip classification techniques between human-only driven vehicles (HDVs), AVs having a safety driver (SDAVs), fully autonomous self-driving vehicles with no safety driver needed (FAVs) (e.g., level 4 or level 5 autonomy), or remotely operated autonomous vehicles. Further described throughout the present disclosure is an on-demand transportation management system that manages on-demand transportation services linking available drivers of purely human-driven vehicles (HDVs), available autonomous vehicles having trained safety drivers (SDAVs), and fully autonomous self-driving vehicles having no safety driver (FAVs) with requesting riders throughout the given region.

In doing so, the on-demand transportation management system (or "transport system") can receive requests for transportation from requesting users via a designated rider application executing on the users' computing devices. On a high level, the transport management system can receive a transport request and identify a number of proximate available vehicles relative to the user. The transport system may then select an available HDV, SDAV, or FAV to service the transport request based on a number of criteria described herein, including risk, estimated time of arrival (ETA) to the pick-up location, expected earnings or profit per candidate vehicle, and the like. As provided herein, examples of the transport request can comprise an on-demand carpooling request, a standard ride-share request, a high-capacity vehicle request, a luxury vehicle request, a professional driver request, a request for AV transportation, a request for item delivery (e.g., a package or food), or any combination of the foregoing. A transport request may also include any general request for transportation that does not necessarily specify the type or category of transportation used to fulfill the request.

According to examples described herein, the transport system can perform a vehicle matching operation given a received transport request from a requesting user. The matching operation can comprise identifying a set of candidate vehicles based on risk regression techniques, trip classification techniques, business optimization techniques, and various other parameters described herein, and ultimately selecting a vehicle to service the transport request. In doing so, the transport system can select between HDVs, SDAVs, and/or FAVs to transport a requesting user from the pick-up location to a destination indicated in the transport request.

As described herein, a "risk regressor" may be used to describe techniques and/or algorithms to compute fractional risk quantities for any given path segment of a given region (e.g., a probability that a harmful event will occur for any given traversal of a specified lane of a road segment between intersections). Furthermore, an example risk regressor may further factor in current environmental conditions (e.g., rain, snow, clouds, road conditions, lighting, lighting direction, and the like), and static risk based on lane geometry, traffic conditions, and time of day to compute a fractional risk quantity dynamically for any path segment at any given time. Such fractional risk quantities can be generalized for human driving, or can be AV and/or AV software version specific.

Accordingly, an example risk regressor may compute an individualized fractional risk quantity for each path segment on a per vehicle or per driver basis given the vehicle's or driver's attributes, such as on-board hardware and software, and an AV state as determined through vehicle telemetry or diagnostics data. In some examples, a particular risk regressor may be trained for a corresponding trip classifier, and may be specific to a software release executable by AVs for verification. In addition, for a given transport request from a requesting user, a route planning system can determine a set of routes between the pick-up location and destination, and the risk regressor can determine an aggregate risk quantity for each of those routes given the current or predicted conditions (e.g., conditions at the time the vehicle traverses a particular path segment), and provide a lowest risk route or other optimal route (e.g., optimized across risk, time, dollar earnings, etc.) as output to a matching engine that pairs the requesting user with an available vehicle.

Examples described herein may reference software training techniques that correspond to machine learning, neural networks, artificial intelligence, and the like. Certain examples provided herein describe training a new risk regressor or trip classifier. Such training can correspond to supervised or unsupervised machine learning methods to accurately quantify fractional risk for traversing any given path segment based on historical harmful event data and/or close call data from AV driving logs and other sensor systems (e.g., driver computing devices). Such training can further correspond to supervised or unsupervised machine learning methods to accurately classify a given route—based on an aggregate risk quantity for the route—to determine which vehicle types are capable of servicing the route (e.g., between HDVs, SDAVs, and FAVs).

Among other benefits, the examples described herein achieve a technical effect of safely expanding autonomous vehicle operations through dynamic risk analysis of driving log data and the creation of navigation maps annotated with risk factor cost data. These risk factor cost data provide for an autonomous vehicle navigation system that increases safety and reduces the likelihood of bad experiences while riding in the vehicle.

The systems, methods, and vehicles described herein can have an additional technical effect and benefit of providing an improvement to vehicle computing technology. For instance, aspects of the present disclosure enable a vehicle control system to more efficiently and safely control the vehicle's motion along a travel route. By determining revised navigation instructions for implementing travel routes when needed, a vehicle control system can avoid certain latency issues that arise by reliance on a remote computing system for off-board operations.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) systems, network equipment (e.g., routers) and tablet devices. Memory, processing, and network resources may all be used in connection with the establishment, use, or performance of any example described herein (including with the performance of any method or with the implementation of any system).

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array and modulate acceleration, steering, and braking inputs to safely drive the AV along a given route.

System Overview

FIG. 1 illustrates an example system for controlling navigation of a vehicle, in accordance with some aspects. A navigation route cost system 100 includes components used in assisting the navigation of the vehicle, which can include a route planning system 110, event parser 120, statistical modeler 130, and a data store 140. Although illustrated separately, one or more of these components may be physically or logically arranged within a single hardware, software, or firmware component.

The data store 140 stores navigation maps, or localization maps, that autonomous vehicles use to navigate through a geographic region. The navigation maps can include road-level data as well as 3D geometry, such as elevation, to determine whether the vehicle is on a road or an overpass/bridge passing over that road. In addition, the data store 140 stores static and dynamic data that the navigation route cost system 100 uses to assist in autonomous vehicle navigation. Static data refers to data that is consistent over long periods of time and rarely changes, such as speed limits, stop signs, and traffic lights. Dynamic data refers to data regarding current conditions in the geographic region, such as traffic and weather. Furthermore, the data store 140 stores log data from a fleet of vehicles operating in the geographic region. This log data can include live or recorded sensor data (e.g., image data, stereoscopic camera data, LIDAR data, radar data), telemetry data (e.g., indicating the vehicle's position, orientation, velocity, current route plan, current trajectory, etc.), diagnostics data (e.g., indicating the vehicle's tire pressures, engine temperature, fuel or energy level, and faults or failures in the sensor, hardware, or mechanical components of the vehicle), and/or input data indicating the AV control system acceleration, braking, and steering input responses.

The event parser 120 retrieves the log data from data store 140 and parses the logs in order to identify features and events that the fleet of vehicles encountered in the geographic region. In some aspects, the event parser 120 identifies trip anomalies, such as harmful events and close calls, that are relevant to one or more risk factor cost layers for path segments in the geographic region. Harmful events can correspond to physical contact between an AV and other objects, such as another vehicle, a curb, a road sign, a pedestrian, and the like. A close call can correspond to any scenario in which a certain risk threshold has been exceeded. For example, a close call can be identified as a spike in accelerometer data in the log data, which can correspond to hard braking events or swerving events. In other examples, close calls can correspond to the AV inadvertently breaching an exclusion zone, such as a crosswalk, an intersection, or getting too close to a pedestrian or other vehicle. In one aspect, the risk factor cost layers comprise an intervention risk factor, including events that indicate the vehicle is incapable of autonomous operation along a given path segment; a bad experience risk factor, including events that indicate hard stops, jerking motions, and other events that impact a passenger experience; and a harmful event risk factor, including collisions involving the vehicle.

In addition to the risk factor cost layers, the event parser 120 can extract features such as road distances, speed limits, traffic signals, school zones, etc. from the localization maps or other mapping data in the data store 140 in order to calculate a score for a travel time cost layer. Furthermore, the event parser 120 can use the mapping data and extract features such as blind alleys and unprotected left turns that may impact one or more of the risk factor cost layers.

In various implementations, the navigation route cost system 100 includes a statistical modeler 130 that can computationally analyze the parsed event data for the geographic region to determine scores for the various cost layers for path segments in the region. Accordingly, for each path segment, the statistical modeler 130 can compute a score for each of the cost layers for traversing the path segment. As provided herein, the cost layer scores can be specific to AVs, specific to particular vehicle models or configurations, or generalized for all vehicles operating within the region. Additionally or alternatively, the cost layer scores may be condition-specific. For example, each harmful event or close call can be correlated with a set of current conditions at the time of the event. Relevant conditions can include lighting conditions, weather conditions (e.g., precipitation or fog), road conditions (e.g., wet, icy, dry, or drying), traffic conditions (e.g., other vehicles and/or pedestrian traffic), a time of day or day of the week, and the like. The navigation route cost system 100 can receive data indicating the current conditions from the AV log data (e.g., sensor data showing the weather and road conditions), or any number of third party resources (e.g., a live weather resource, live traffic resources, etc.). For a given travel route through the geographic region, the navigation route cost system 100 can compare current conditions to the condition-dependent cost layer scores from the statistical modeler 130 to ultimately determine values for the path segments.

In some aspects, the statistical modeler 130 includes separate risk regressors 132 for each of the different cost layers. In other aspects, the statistical model is generated through a machine learning 134 process and can be trained from a manually and/or automatically labeled dataset of driving log data. In further aspects, the statistical modeler 130 can combine the output of the risk regressors 132 and apply machine learning 134 at run-time.

Figure 2:
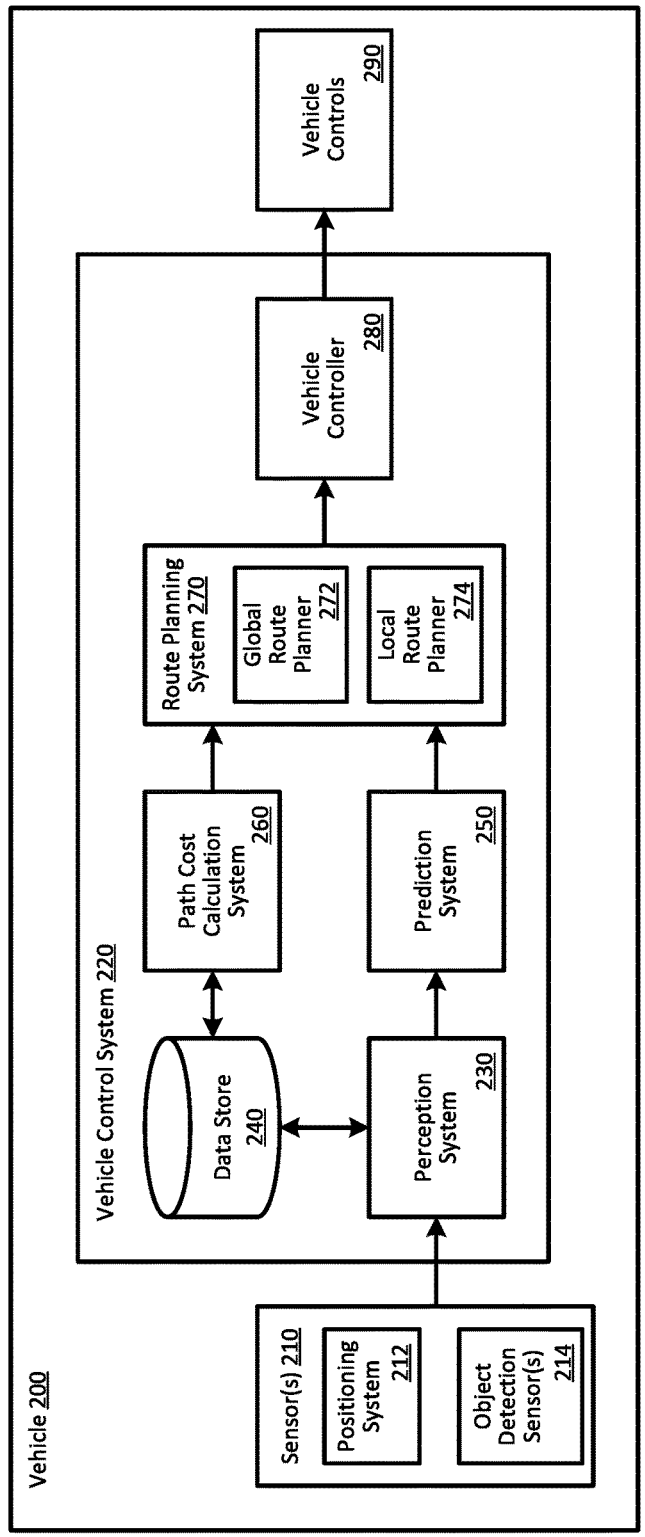
FIG. 2 illustrates an example vehicle and control system for autonomous vehicle routing using annotated maps, in accordance with some aspects.

FIG. 2 illustrates an example vehicle and control system for autonomous vehicle routing using annotated maps, in accordance with some aspects. In an example of FIG. 2, a vehicle control system 220 can autonomously operate the vehicle 200 in a given geographic region for a variety of purposes, including transport services (e.g., transport of humans, delivery services, etc.). In examples described, the vehicle 200 can operate autonomously without human control. For example, the vehicle 200 can autonomously steer, accelerate, shift, brake, and operate lighting components. Some variations also recognize that the vehicle 200 can switch between an autonomous mode, in which the vehicle control system 220 autonomously operates the vehicle 200, and a manual mode in which a safety driver takes over manual control of the acceleration system, steering system, braking system, and lighting and auxiliary systems (e.g., directional signals and headlights).

The vehicle 200 incorporating the vehicle control system 220 can be a ground-based vehicle (e.g., car, truck, bus), an air-based vehicle (e.g., airplane, drone, helicopter, or other aircraft), or other type of vehicle (e.g., watercraft). In some implementations, the vehicle 200 can be manually navigated. In other implementations, the vehicle 200 is an autonomous vehicle (AV) configured to drive, navigate, operate, etc. with minimal and/or no interaction from a human driver. For example, when the vehicle 200 is an autonomous vehicle, the vehicle 200 can be configured to operate in one or more modes such as, for example, a fully autonomous operational mode and/or a semi-autonomous operational mode. A fully autonomous (e.g., self-driving) operational mode can be one in which the vehicle 200 can provide driving and navigational operation with no interaction from a human driver. A semi-autonomous operational mode can be one in which the vehicle 200 can operate with some interaction from a human driver present in the vehicle 200. In some implementations, the vehicle 200 can be associated with an entity (e.g., a service provider) that provides one or more vehicle services to a plurality of users via a fleet of vehicles. The vehicle services can include transportation services (e.g., rideshare services), courier services, delivery services, and/or other types of services. The vehicle services can transport and/or deliver passengers as well as items, food, animals, freight, purchased goods, etc.

As illustrated in FIG. 2, the vehicle 200 can be equipped with one or more sensors 210, a vehicle control system 220, and one or more vehicle controls 290. One or more of these systems can be configured to communicate with one another via communication channels. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

In some aspects, the one or more sensors 210 include a positioning system 212 for determining a current geographic location of the vehicle 200 and/or one or more object detection sensors 214. The positioning system 212 can be any device or circuitry for analyzing the position of the vehicle. For example, the positioning system 212 can determine actual or relative position of vehicle 200 by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position). Object detection sensors 214 can include, for example, a Light Detection and Ranging (LIDAR) system, a Radio Detection and Ranging (RADAR) system, one or more cameras (e.g., visible spectrum cameras, infrared cameras, stereoscopic cameras, etc.) or other image capture devices. Sensor data from the object detection sensors 214 can include information that describes the location (e.g., in three-dimensional space relative to the vehicle 200) of points that correspond to objects within the surrounding environment of the vehicle 200 (e.g., at one or more times).

In some implementations, the sensors 210 can be used to facilitate navigation of vehicle 200 when the vehicle 200 is operating in an autonomous mode. In addition, the sensors 210 gather and log data as the vehicle 200 traverses routes within a given geographic region.

In one aspect, the vehicle control system 220 includes a perception system 230, a prediction system 250, and a route planning system 270 that operate together to process the sensor data for the surrounding environment of the vehicle 200 and determine a route and a motion plan for controlling the vehicle 200 along the route through the geographic region.

The perception system 230 can identify one or more objects that are proximate to the vehicle 200 based on sensor data received from the one or more sensors 210. In addition to using the sensor data, the perception system 230 can retrieve map data (e.g., localization maps) that provide detailed information about the surrounding environment of the vehicle. The map data can provide information regarding the identity and location of different paths (e.g., roads, road segments, lanes, lane segments, parking lanes, turning lanes, bicycle lanes, or other portions of a particular path). In some examples, path segments within the map data can include one or more descriptors including, for example, a path segment identifier, a start point for the path segment, an end point for the path segment, a directionality (e.g., direction of traffic flow), and/or connectivity identifiers for other path segments that are predecessors and/or successors to a given path segment. Map data can also include the identity and location of buildings, maintenance/service locations for the vehicles, parking areas, traffic signs, traffic lights, traffic control devices, and/or any other features that provide information that could assist the vehicle control system 220 in perceiving and navigating the surrounding environment. In one aspect, the vehicle 200 can store the map data in a data store 240.

In some implementations, the perception system 230 can determine, for each object, state data that describes a current state of the object. As examples, the state data for each object can describe an estimate of the object's current location (also referred to as position), current speed (also referred to as velocity), current acceleration, current heading, current orientation, size/footprint (e.g., as represented by a bounding shape such as a bounding polygon or polyhedron), class (e.g., vehicle, pedestrian, bicycle), yaw rate, and/or other state information. In some implementations, the perception system 230 can determine state data for each object over a number of iterations. In particular, the perception system 230 can update the state data for each object at each iteration. Thus, the perception system 230 can detect and track objects that are proximate to the vehicle 200 over time.

The prediction system 250 can receive the state data from the perception system 230 and predict one or more future locations for each object based on the state data. For example, the prediction system 250 can predict where each object will be located within the next 5 seconds, 10 seconds, 20 seconds, etc. As one example, an object can be predicted to adhere to its current trajectory according to its current speed. In other examples, more sophisticated prediction techniques or models can be used.

In some aspects, state data generated by the perception system 230, raw sensor data from the sensors 210, and other data that the vehicle control system 220 generates (e.g., acceleration, braking, and steering outputs generated by the vehicle controller) are saved in the data store 240 along with the map data. These data make up the driving logs for the vehicle 200, which can be uploaded or copied to remote servers for compilation and analysis (i.e., by components of the navigation cost route system 100 illustrated in FIG. 1). In addition, the data store 240 can store results of driving log analysis, including cost layer scores for path segments in the geographic region in which vehicle 200 operates. For example, in implementations where aspects of the navigation cost route system 100 are performed on remote servers, the vehicle control system 220 can download cost layer scores and other data, such as regressor models, relevant to route planning on the vehicle 200.

In some aspects, the vehicle control system 220 includes a path cost calculation system 260, which can annotate the map data from the data store 240 with a focused set of cost layers so that the route planning system 270 can use the annotated maps for efficient vehicle routing. In some implementations, the set of cost layers relate to travel time, safety, and rider experience. Some of these cost layers are risk factors that impact safety and rider experience. Cost layers can be specific to the operation of autonomous vehicles (e.g., an intervention risk that models the likelihood that the vehicle requires manual input to navigate a path segment) or applicable to both autonomous vehicles (AVs) and human-driven vehicles (e.g., an estimated travel time for a path segment).

In some aspects, the path cost calculation system 260 models scores for each of the cost layers, including the travel time and risk factor cost layers, for path segments (i.e., predetermined lengths of a road or lane of a road) in the geographic region. Events and features extracted and identified from logs and mapping data are provided as input to a statistical model that outputs scores for the cost layers. In some examples, the statistical model applies a separate regression analysis for each of the different cost layers. In other examples, the statistical model is a machine-learned model that can be trained from a manually and/or automatically labeled dataset of vehicle logs and maps. In further aspects, the path cost calculation system 260 can retrieve pre-calculated cost layer scores, either from the data store 240 or from a remote server, and then apply machine learning techniques to update the cost layer scores at runtime. The path cost calculation system 260 periodically updates, or annotates, navigation maps for the geographic region to include the cost layer scores generated from the statistical modelling.

In some aspects, the path cost calculation system 260 takes into account dynamic data, such as real-time traffic and weather, for the geographic region in which the vehicle 200 is operating. Furthermore, the path cost calculation system 260 can take into account performance and capability characteristics of the vehicle 200 when modeling scores for the cost layers. For example, the likelihood of harmful events may be increased in the rain, although all-wheel drive vehicles or vehicles equipped with tires that have good performance when wet may be affected less.

The path cost calculation system 260 annotates the navigation maps with an overall value for each path segment, which is a weighted sum of the individual cost layer scores in some implementations. The weights applied to each of the individual cost layers can be determined by the path cost calculation system 260 itself, retrieved from the data store 240, or retrieved from a remote server. In addition, machine learning techniques can be applied to automatically adjust the weights between the cost layers based on which layers are deemed more important to the vehicle 200 and riders. For example, the path cost calculation system 260 can adjust the weights by taking into account performance and capability characteristics of the vehicle 200.

A global route planner 272 can use the annotated maps to determine routes between locations in the geographic region that take the costs into account, thereby enabling the vehicle 200 to select a route that avoids high cost or otherwise problematic road segments in terms of the cost layers. In some aspects, the route planning system 270 retrieves live data for the geographic region in which the vehicle 200 is operating. The live data can include constraints and modifications affecting the values for path segments in the region. For example, a sporting event or concert in an area may have a large impact on travel times and driving safety for adjacent roads; therefore the costs of driving on those roads may be substantially higher, and the global route planner 272 can take those costs into account, either through automatically determined or manual constraints imposed on path segments through that area.

In some aspects, the global route planner 272 combines path segments in the geographic region to generate a travel route from a first location (e.g., a pick-up location for a passenger) to a second location (e.g., a travel destination) based on the path segment values in the annotated maps. For example, the global route planner 272 can determine the travel route with the lowest total cost, or at least a travel route that avoids higher cost alternatives.

The local route planner 274 (also known as a motion planner) can determine a motion plan for the vehicle based at least in part on the travel route selected by the global route planner 272 and/or the predicted one or more future locations for objects and/or the state data for objects provided by the perception system 230. Stated differently, given information about the current locations of objects and/or predicted future locations of proximate objects, as well as the selected travel route, the local route planner 274 can determine a motion plan for the vehicle 200 that safely navigates the vehicle 200 along the individual path segments of travel route relative to any detected objects.

As one example, the local route planner 274 can determine a cost function for each of one or more candidate motion plans for the vehicle 200 based at least in part on the current locations and/or predicted future locations of any detected objects. For example, the cost function can describe a cost (e.g., over time) of adhering to a particular candidate motion plan. For example, the cost described by a cost function can increase when the vehicle expects to impact another object and/or deviate from the travel route. In some aspects, the local route planner 274 can also take into account path segment values from the annotated maps. For example, if the local route planner 274 determines that the vehicle 200 should deviate from the travel route (e.g., to avoid an object in the road or pass a slow driver), the local route planner 274 can select an alternate path segment based on which alternate path segment has lower travel time or risk factor costs.

Thus, given information about the current locations and/or predicted future locations of objects, the local route planner 274 can determine a cost of adhering to a particular candidate pathway. The local route planner 274 can select or determine a motion plan for the vehicle based at least in part on the cost functions. For example, the motion plan that minimizes the cost function, or at least avoids higher cost alternatives, can be selected. The local route planner 274 can provide the selected motion plan to a vehicle controller 280 that controls one or more vehicle controls 290 (e.g., actuators or other devices that control throttle, steering, braking, etc.) to execute the selected motion plan.

Figure 3:
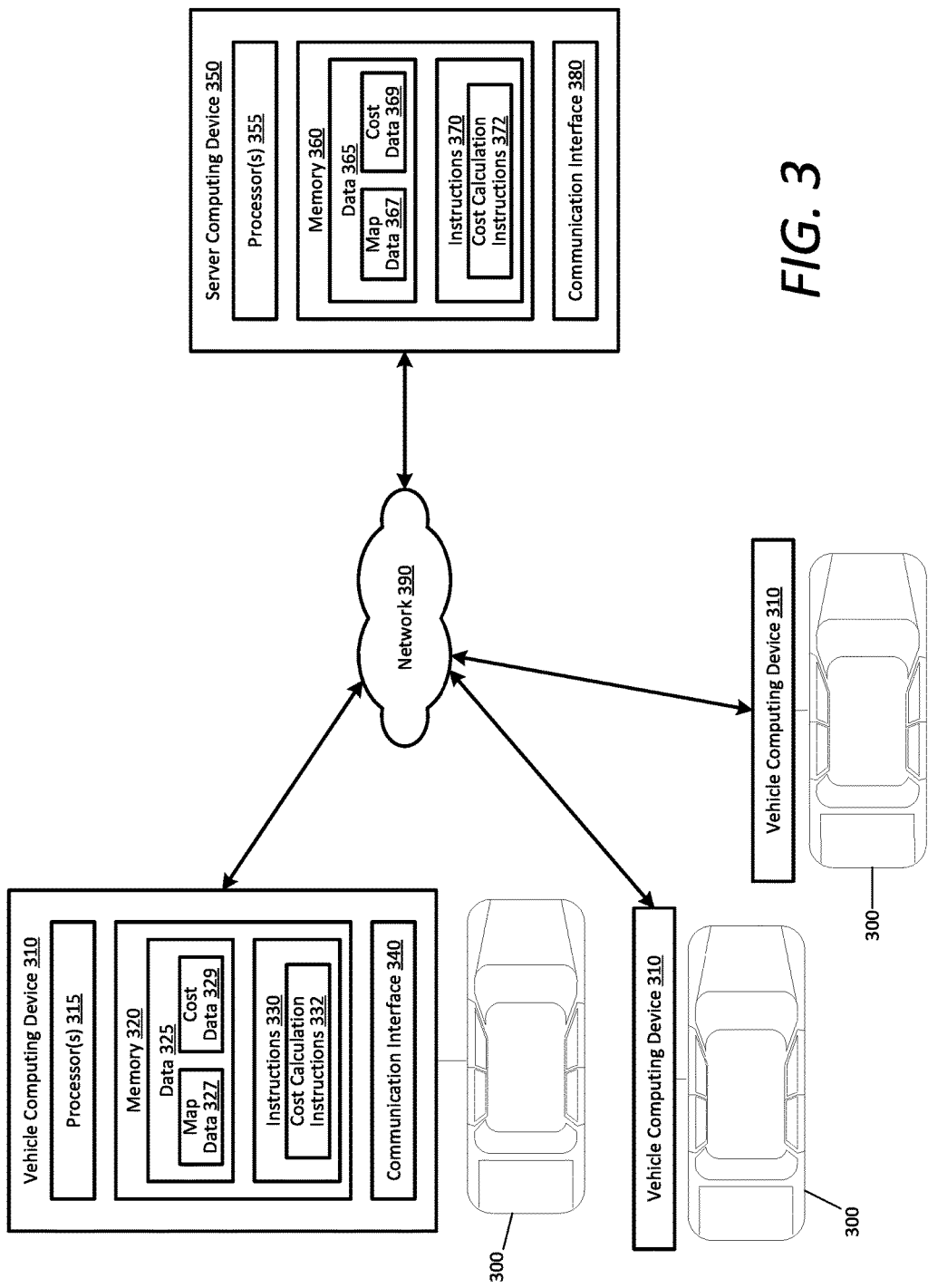
FIG. 3 illustrates an example network system for autonomous vehicle routing using annotated maps, in accordance with some aspects.

FIG. 3 illustrates an example network system for autonomous vehicle routing using annotated maps, in accordance with some aspects. The example network system includes computing devices upon which aspects described herein may be implemented. For example, in the context of FIG. 1, the navigation route cost system 100 may be implemented using one or more vehicle computing devices 310, a server computing device 350, or a combination of such devices as described by FIG. 3. Moreover, in the context of FIG. 2, the vehicle control system 220 may be implemented using one or more vehicle computing devices 310. FIG. 3 illustrates an example implementation in which one or more server computing devices 350 are communicatively coupled with one or more vehicle computing devices 310 over a network 390. Each vehicle computing device can be part of a vehicle control system 220 associated with a particular vehicle 300.

Each vehicle computing device 310 can include one or more processors 315 and a memory 320. The one or more processors 315 can be any suitable processing device (e.g., a processor core, a microprocessor, an ASIC, a FPGA, a controller, a microcontroller, etc.) and can be one processor or a plurality of processors that are operatively connected. The memory 320 can include one or more non-transitory computer-readable storage mediums, such as RAM, ROM, EEPROM, EPROM, flash memory devices, magnetic disks, etc., and combinations thereof. The memory 320 can store data 325 and instructions 330, which the processor 315 can execute to cause the vehicle computing device 310 to perform operations. The data 325 can include map data 327 and cost data 329. The instructions 330 can include cost calculation instructions 332 that, when executed, implement one or more steps, features, or aspects of example methods for determining values for path segments based on risk factors associated with autonomous operation of the vehicle 300 along path segments.

The vehicle computing devices 310 can obtain map data 327 and/or cost data 329 via interaction with the server computing devices 350 that are communicatively coupled over the network 390. The server computing devices 350 can be separate from the vehicle computing devices 310 and provided in a location remote from the vehicle computing devices 310, for instance, in a central control system associated with a service provider, owner, and/or fleet operator controlling a fleet of vehicles 300.

The one or more server computing devices 350 can include one or more processors 355 and a memory 360. The memory can store data 365 and instructions 370 which the processor 355 can execute to cause the remote computing devices to perform operations. The data 365 can include map data 367 and cost data 369. The instructions 370 can include cost calculation instructions 372 that, when executed, implement one or more steps, features, or aspects of example methods for determining values for path segments based on risk factors associated with autonomous operation of the vehicle 300 along path segments.

The network 390 can be any type of communications network, such as a local area network (e.g., intranet), wide area network (e.g., Internet), or some combination thereof and can include any number of wired or wireless links. In general, communication over the network 390 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some examples, vehicle computing devices 310 and/or server computing devices 350 can further include one or more communication interfaces 340, 380, including any suitable components (transmitters, receivers, ports, controllers, antennas, etc.) for interfacing with the network 390. In addition, the communication interfaces 340, 380 can also access third party resources over the network 390 to receive map data and condition data that indicate the current conditions in a geographic region, including traffic data, live weather data, and/or event data for the given region (e.g., parades, protests, bicycle or running races, gatherings, and the like).

The communication interface 380 of the server computing devices 350 can also receive driving log data streamed or periodically transmitted from the vehicles 300. The driving log data can include live telemetry and diagnostics data, live sensor data streams, and data indicating the AV's planned trajectory and overall route. The server computing device 350 can execute cost calculation instructions 372 to compile and analyze the driving log data to identify events and features relevant to one or more cost layers. In addition, vehicle computing devices 310 and server computing devices 350 can employ statistical modeling techniques applied to events, features, current conditions, and vehicle 300 specifications, among other factors, to determine values for path segments based on risk factors associated with autonomous operation of the vehicle 300 along each path segment within a geographic region. Furthermore, vehicle computing devices 310 and server computing devices 350 can dynamically determine values for the path segments and adjust a travel route accordingly during operation of the vehicle 300.

Examples described herein recognize that conditions, such as traffic, weather, or lighting may change over the course of a single trip. These changing conditions can affect the autonomous performance of the SDAVs and FAVs such that current risks for the remainder of the trip or for certain path segments may increase to unacceptable levels. In various examples, these changes can trigger the vehicle computing device 310 to determine whether conditions are safe enough for the SDAVs and FAVs to operate in autonomous mode along a given path segment.

Methodology

Figure 4:
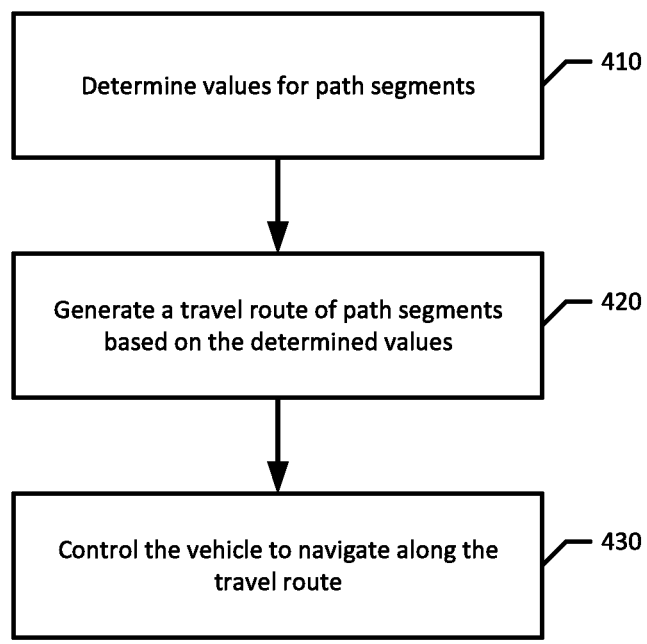
FIG. 4 is a flow chart describing an example method of autonomous vehicle routing using annotated maps.
Figure 5:
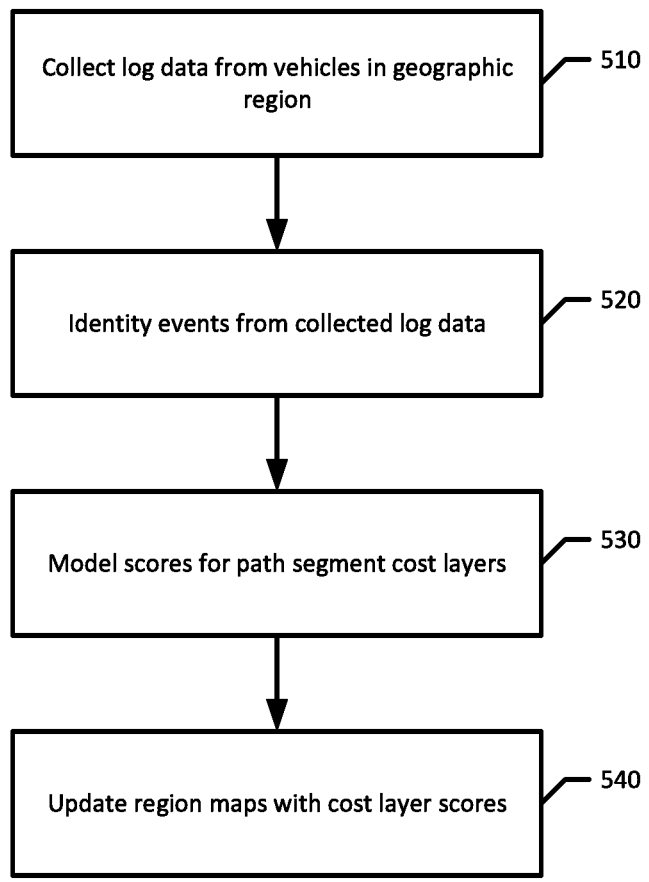
FIG. 5 is a flow chart describing an example method of annotating maps for vehicle routing.
Figure 6:
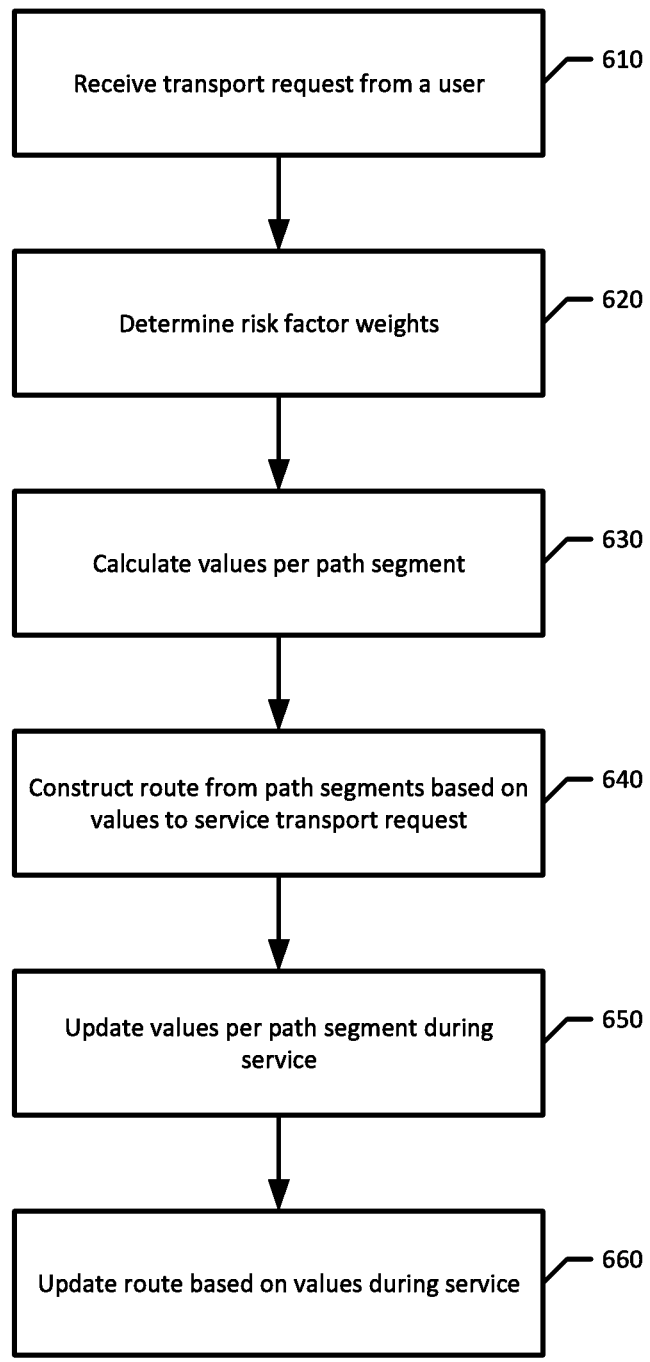
FIG. 6 is a flow chart describing an example method of autonomous vehicle route planning for a transportation service.
Figure 7:
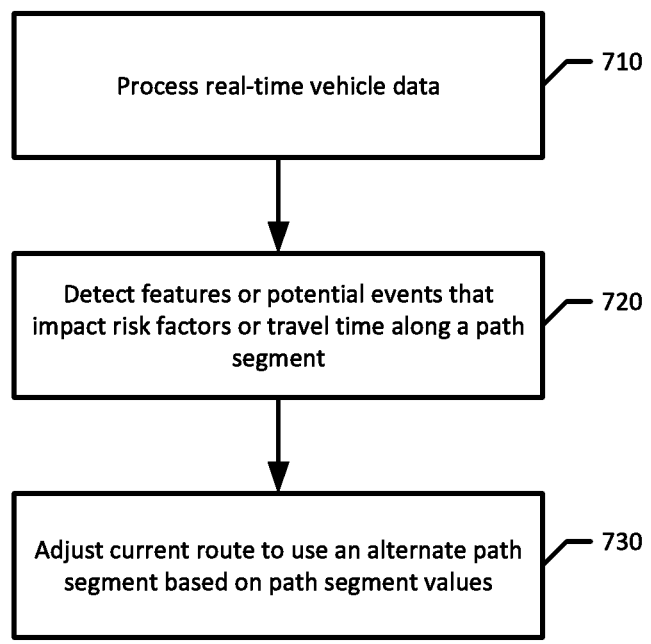
FIG. 7 is a flow chart describing an example method of local route planning using annotated maps.

FIG. 4 is a flow chart describing an example method of autonomous vehicle routing using annotated maps, FIG. 5 is a flow chart describing an example method of annotating maps for vehicle routing, FIG. 6 is a flow chart describing an example method of autonomous vehicle route planning for a transportation service, and FIG. 7 is a flow chart describing an example method of local route planning using annotated maps. While operations of the methods may be described below as being performed by specific components, modules, or systems of the navigation route cost system 100, vehicle control system 220, or vehicle computing device 310, these operations need not necessarily be performed by the specific components identified, and could be performed by a variety of components and modules, potentially distributed over a number of machines. Accordingly, references may be made to elements of FIGS. 1-3 for the purpose of illustrating suitable components or elements for performing steps or sub-steps being described. In alternate implementations, some of the steps of these methods may be performed in parallel or in a different order than illustrated.

With reference to an example of FIG. 4, a navigation route cost system determines values for path segments within a geographic region in which the vehicle is operating (410). In some aspects, the navigation route cost system determines the path segment values based on a number of risk factors that are associated with autonomous operation of the vehicle along each path segment. The risk factors represent different types of undesirable events that may occur on the path segment. For example, one risk factor is an intervention risk, which is when the vehicle is incapable of autonomous operation along a given path segment. Other examples of risk factors include a bad experience risk, which includes hard stops, jerking motions, and other events that impact a passenger experience, and a harmful event risk, including a collision involving the vehicle.

A route planning system, whether located on the vehicle itself or in remote communication with the vehicle, combines a number of the path segments together to generate a travel route, from a first location to a second location, based on the determined values (420). In some aspects, the route planning system generates a travel route using the set of path segments between the first location and the second location that minimizes a sum of the determined values for those path segments.

Once the travel route is generated, the vehicle navigates along the individual path segments that comprise the travel route to the second location (430).

With reference to an example of FIG. 5, a navigation route cost system annotates road maps with a focused set of cost layers so that route planning systems can use the annotated maps for efficient vehicle routing. In some implementations, the set of cost layers relate to travel time, safety, and rider experience. Some of these cost layers are risk factors that impact safety and rider experience. Cost layers can be specific to the operation of autonomous vehicles (e.g., an intervention risk that models the likelihood that the vehicle requires manual input to navigate a path segment) or applicable to both autonomous vehicles (AVs) and human-driven vehicles (e.g., an estimated travel time for a path segment). The navigation cost route system determines scores for each of the cost layers through statistical modelling of events and road features identified from pre-existing localization maps and driving logs.

In some aspects, the navigation cost route system collects log data from a fleet of vehicles operating in a given geographic region (510). The log data can include live or recorded sensor data (e.g., image data, stereoscopic camera data, LIDAR data, radar data), telemetry data (e.g., indicating the vehicle's position, orientation, velocity, current route plan, current trajectory, etc.), diagnostics data (e.g., indicating the vehicle's tire pressures, engine temperature, fuel or energy level, and faults or failures in the sensor, hardware, or mechanical components of the vehicle), and/or input data indicating the AV control system acceleration, braking, and steering input responses. AVs having a safety driver (SDAVs) and fully autonomous self-driving vehicles with no safety driver (FAVs) can transmit or stream the log data to the navigation cost route system or server computing device over a network. In some examples, the vehicles can store the log data on the vehicle, and the log data is uploaded to the server at fixed intervals or on demand.

In some aspects, the navigation route cost system parses the log data and identifies events that are relevant to one or more risk factor cost layers for path segments in the geographic region (520). In one example, the risk factors comprise an intervention risk factor, including events that indicate the vehicle is incapable of autonomous operation along a given path segment; a bad experience risk factor, including events that indicate hard stops, jerking motions, and other events that impact a passenger experience; and a harmful event risk factor, including collisions involving the vehicle.

In addition to the risk factor cost layers, the navigation route cost system extracts features such as road distances, speed limits, traffic signals, school zones, etc. from pre-existing localization maps or other mapping data in order to calculate a score for a travel time cost layer. Furthermore, the navigation route cost system can use the mapping data and extract features such as blind alleys and unprotected left turns that may impact one or more of the risk factor cost layers.

In some aspects, the navigation route cost system models scores for each of the cost layers, including the travel time and risk factor cost layers, for path segments (i.e., predetermined lengths of a road or lane of a road) in the geographic region (530). The different events and features extracted and identified from logs and mapping data are provided as input to a statistical model that outputs scores for the cost layers. In some examples, the statistical model applies a separate regression analysis for each of the different cost layers. In other examples, the statistical model is a machine-learned model that can be trained from a manually and/or automatically labeled dataset of vehicle logs and maps.

In some aspects, the navigation route cost system updates, or annotates, navigation maps for the geographic region to include the cost layer scores generated from the statistical modelling (540). Together with weights for each of the cost layers, a route planner can use the annotated maps to determine routes between locations in the geographic region that take the costs into account, thereby enabling an autonomous vehicle to select a route that avoids high cost or otherwise problematic road segments in terms of the cost layers.

With reference to an example of FIG. 6, an on-demand transport management system (or "transport system") can receive requests for transportation from requesting users via a designated rider application executing on the users' computing devices (610). The transport system can receive a transport request and identify a number of proximate available vehicles relative to the user. The transport system may then select an available vehicle to service the transport request based on a number of criteria, including risk factors, estimated time of arrival (ETA) to the pick-up location, expected earnings or profit per candidate vehicle, and the like.

According to examples described herein, the transport system can perform a vehicle matching operation given a received transport request from a requesting user. The matching operation can comprise identifying a set of candidate vehicles based on risk regression techniques, trip classification techniques, business optimization techniques, and various other parameters, and ultimately selecting a vehicle to service the transport request. In doing so, the transport system can select between HDVs, SDAVs, and/or FAVs to transport a requesting user from the pick-up location to a destination indicated in the transport request.

A navigation route cost system determines a set of risk factor weights to apply to each of the various cost layers in the annotated maps (620). The weights applied to each of the individual cost layers can be pre-calculated and stored or calculated periodically, either at a server or a vehicle control system. In addition, machine learning techniques can be applied to automatically adjust the weights between the cost layers based on which layers are deemed more important to the vehicle and riders. For example, the weights can be adjusted by taking into account performance and capability characteristics of the vehicle.

Using the cost layer data, the navigation route cost system can determine overall values for each path segment by applying the set of risk factor weights to the cost layer data (630). In some aspects, the overall value for each path segment is a weighted sum of each of the individual cost layers, and the navigation route cost system can annotate the maps with the overall costs for each path segment.

A route planning system can use the annotated maps to determine routes between locations in the geographic region that take the costs into account, thereby enabling the vehicle to select a route that avoids high cost or otherwise problematic road segments in terms of the cost layers (640). In some aspects, the route planning system combines path segments in the geographic region to generate a travel route from a first location (e.g., a pick-up location for a passenger) to a second location (e.g., a travel destination) based on the path segment values in the annotated maps. For example, the route planning system can determine the travel route with the lowest total cost, or at least a travel route that avoids higher cost alternatives.

In some aspects, the navigation route cost system periodically updates values for each of the path segments (650). For example, conditions such as traffic, weather, or lighting may change over the course of a single trip. These changing conditions can affect the autonomous performance of the SDAVs and FAVs such that current risks and travel times for the remainder of the trip or for certain path segments may increase or decrease. As a result of these changes, the route planning system can update the travel route in order to select a set of lower cost path segments to reach the destination (660).

With reference to an example of FIG. 7, a vehicle perception system can process sensor data from vehicle sensors to identify one or more objects that are proximate to the vehicle (710). In addition to using the sensor data, the perception system can retrieve map data (e.g., localization maps) that provide detailed information about the surrounding environment of the vehicle. The map data can provide information regarding the identity and location of different paths (e.g., roads, road segments, lanes, lane segments, parking lanes, turning lanes, bicycle lanes, or other portions of a particular path). In some examples, path segments within the map data can include one or more descriptors including, for example, a path segment identifier, a start point for the path segment, an end point for the path segment, a directionality (e.g., direction of traffic flow), and/or connectivity identifiers for other path segments that are predecessors and/or successors to a given path segment. Map data can also include the identity and location of buildings, maintenance/service locations for the vehicles, parking areas, traffic signs, traffic lights, traffic control devices, and/or any other features that provide information that could assist the vehicle control system in perceiving and navigating the surrounding environment.

In some implementations, the perception system can determine, for each object, state data that describes a current state of the object. As examples, the state data for each object can describe an estimate of the object's current location (also referred to as position), current speed (also referred to as velocity), current acceleration, current heading, current orientation, size/footprint (e.g., as represented by a bounding shape such as a bounding polygon or polyhedron), class (e.g., vehicle, pedestrian, bicycle), yaw rate, and/or other state information. In some implementations, the perception system can determine state data for each object over a number of iterations. In particular, the perception system can update the state data for each object at each iteration. Thus, the perception system can detect and track objects that may impact risk factors or travel time along a given path segment (720).

An object prediction system can receive the state data from the perception system and predict one or more future locations for each object based on the state data. For example, the prediction system can predict where each object will be located within the next 5 seconds, 10 seconds, 20 seconds, etc. As one example, an object can be predicted to adhere to its current trajectory according to its current speed.

A local route planner, or motion planner, can determine a motion plan for the vehicle based at least in part on the travel route selected by the route planning system and/or predicted future locations for objects and/or the state data for objects provided by the vehicle's perception system. Stated differently, given information about the current locations of objects and/or predicted future locations of proximate objects, as well as the selected travel route, the local route planner 274 can determine a motion plan for the vehicle that safely navigates the vehicle 200 along the individual path segments of travel route relative to any detected objects.

As one example, the local route planner can determine a cost function for each of one or more candidate motion plans for the vehicle based at least in part on the current locations and/or predicted future locations of any detected objects. For example, the cost function can describe a cost (e.g., over time) of adhering to a particular candidate motion plan. For example, the cost described by a cost function can increase when the vehicle expects to impact another object and/or deviate from the travel route. In some aspects, the local route planner can also take into account path segment values from the annotated maps. For example, if the local route planner determines that the vehicle 200 should deviate from the travel route (e.g., to avoid an object in the road or pass a slow driver), the local route planner can select an alternate path segment based on which alternate path segment has lower travel time or risk factor costs (730).

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventors from claiming rights to such combinations.

What is claimed is:

1. A system for controlling navigation of a vehicle, comprising:
   one or more processors; and
   one or more memory resources storing instructions that, when executed by the one or more processors, cause the system to:
   for a set of path segments within a geographic region in which the vehicle is operating, determine a risk value for each respective path segment of the set of path segments based on a plurality of risk factors associated with autonomous operation of the vehicle along the respective path segment;
   based on the determined risk value for each respective path segment of the set of path segments, combine a plurality of path segments from the set of path segments to generate a travel route for the vehicle from a first location to a second location; and autonomously control the vehicle to navigate along the travel route;

wherein the determined risk value for each respective path segment of the set of path segments represents a cost layer in a corresponding map utilized by the vehicle for autonomous operation along the respective path segment, and wherein the system generates the travel route based on a sum of the determined risk values for the plurality of path segments.

2. The system of claim 1, wherein determination of the values for each respective path segment comprises using a weighted sum of (1) scores for each of the plurality of risk factors for the respective path segment, and (2) a travel time calculation for the respective path segment.

3. The system of claim 2, wherein the scores for each of the plurality of risk factors represent probabilities that an undesirable event may occur during autonomous operation of the vehicle along the respective path segment.

4. The system of claim 2, wherein the scores for each of the plurality of risk factors and the travel time calculation are determined by a statistical model.

5. The system of claim 4, wherein the statistical model determines the scores for each of the plurality of risk factors based, at least in part, on sensor data collected from a plurality of sensors coupled to the vehicle and from other vehicles operating throughout the geographic region.

6. The system of claim 5, wherein the executed instructions further cause the system to:
analyze the sensor data to identify events that impact one or more of the plurality of risk factors.

7. The system of claim 5, wherein the executed instructions further cause the system to:
determine, from the sensor data, one or more road conditions for a current path segment that affect one or more of the plurality of risk factors; and
autonomously control the vehicle to navigate along an alternate path segment based on a determined risk value for the current path segment.

8. The system of claim 1, wherein the executed instructions further cause the system to:
receive, over one or more networks, a transport request for a user, the transport request indicating a pick-up location and a destination; and
use the pick-up location as the first location and the destination as the second location.

9. The system of claim 1, wherein the set of path segments correspond to lanes of roads identified in a set of localization maps for the geographic region.

10. The system of claim 1, wherein the plurality of risk factors comprise an intervention risk, including when the vehicle is incapable of autonomous operation along a given path segment; a bad experience risk, including hard stops, jerking motions, and other events that impact a passenger experience; and a harmful event risk, including a collision involving the vehicle.

11. The system of claim 1, wherein the system comprises a component of the vehicle.

12. A method of controlling navigation of a vehicle, the method being implemented by one or more processors and comprising:
for a set of path segments within a geographic region in which the vehicle is operating, determining a risk value for each respective path segment of the set of path segments based on a plurality of risk factors associated with autonomous operation of the vehicle along the respective path segment;
based on the determined risk value for each respective path segment of the set of path segments, combining a plurality of path segments from the set of path segments to generate a travel route for the vehicle from a first location to a second location; and
autonomously controlling the vehicle to navigate along the travel route;
wherein the determined risk value for each respective path segment of the set of path segments represents a cost layer in a corresponding map utilized by the vehicle for autonomous operation along the respective path segment, and wherein the one or more processors generate the travel route based on a sum of the determined risk values for the plurality of path segments.

13. The method of claim 12, wherein the one or more processors determine the risk value for each respective path segment of the set of path segments using a weighted sum of (1) scores for each of the plurality of risk factors for the respective path segment and, (2) a travel time calculation for the respective path segment.

14. The method of claim 13, wherein the scores for each of the plurality of risk factors represent probabilities that an undesirable event may occur during autonomous operation of the vehicle along the respective path segment.

15. The method of claim 13, wherein the scores for each of the plurality of risk factors and the travel time calculation are determined by a statistical model.

16. The method of claim 15, wherein the statistical model determines the scores for each of the plurality of risk factors based, at least in part, on sensor data collected from a plurality of sensors coupled to the vehicle and from other vehicles operating throughout the geographic region.

17. The method of claim 16, further comprising:
analyzing the sensor data to identify events that impact one or more of the plurality of risk factors.

18. The method of claim 16, further comprising:
determining, from the sensor data, one or more road conditions for a current path segment that affect one or more of the plurality of risk factors; and
autonomously controlling the vehicle to navigate along an alternate path segment based on a determined risk value for the current path segment.

19. A vehicle comprising:
a plurality of sensors that generate sensor data to determine a plurality of risk factors associated with autonomous operation of the vehicle;
one or more processors; and
one or more memory resources storing instructions that, when executed by the one or more processors, cause the vehicle to:
for a set of path segments within a geographic region in which the vehicle is operating, determine a risk value for each respective path segment of the set of path segments based on a plurality of risk factors associated with autonomous operation of the vehicle along the respective path segment;
based on the determined risk value for each respective path segment of the set of path segments, combine a plurality of the path segments to generate a travel route for the vehicle from a first location to a second location; and
autonomously control the vehicle to navigate along the travel route;
wherein the determined risk value for each respective path segment of the set of path segments represents a cost layer in a corresponding map utilized by the vehicle for autonomous operation along the respective path segment, and wherein the vehicle generates the travel route based on a sum of the determined risk values for the plurality of path segments.

\* \* \* \* \*